United States Patent
Ericson et al.

(10) Patent No.: US 10,841,845 B2
(45) Date of Patent: Nov. 17, 2020

(54) METHODS AND APPARATUS FOR MEASUREMENT AND MEASUREMENT REPORTING IN A WIRELESS NETWORK

(71) Applicant: Telefonaktiebolaget LM Ericsson (publ), Stockholm (SE)

(72) Inventors: Mårten Ericson, Luleå (SE); Jan Christoffersson, Luleå (SE); Victor Farias Monteiro, Fortaleza (BR); Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/337,823

(22) PCT Filed: Sep. 28, 2017

(86) PCT No.: PCT/SE2017/050949
§ 371 (c)(1),
(2) Date: Mar. 28, 2019

(87) PCT Pub. No.: WO2018/063073
PCT Pub. Date: Apr. 5, 2018

(65) Prior Publication Data
US 2020/0015135 A1    Jan. 9, 2020

Related U.S. Application Data

(60) Provisional application No. 62/402,367, filed on Sep. 30, 2016.

(51) Int. Cl.
H04W 4/00    (2018.01)
H04W 36/00   (2009.01)
(Continued)

(52) U.S. Cl.
CPC ....... *H04W 36/0094* (2013.01); *H04W 24/10* (2013.01); *H04W 48/18* (2013.01)

(58) Field of Classification Search
CPC ............. H04W 24/10; H04W 36/0005; H04W 36/0007; H04W 36/0011; H04W 36/0058;
(Continued)

(56) References Cited

U.S. PATENT DOCUMENTS 9,775,089 B2 * 9/2017 Payyappilly .......... H04W 24/10
9,924,422 B2 * 3/2018 Kim ...................... H04W 24/10
(Continued)

FOREIGN PATENT DOCUMENTS

WO    WO 2007/016940 A1    2/2007

OTHER PUBLICATIONS

Bulakci et al, Deliverable D5.1 Draft Synchronous Control Functions and Resource Abstraction Considerations, Version: v1.0, Mobile and wireless communications Enablers for the Twenty-twenty Information Society—II, 129 pages, May 31, 2016.*
(Continued)

*Primary Examiner* — Frank Duong
(74) *Attorney, Agent, or Firm* — Sage Patent Group

(57) ABSTRACT

A method in a terminal device of a wireless network, the wireless network further comprising first and second radio access nodes, the method comprising: repeatedly measuring one or more metrics for signals transmitted by the first radio access node and signals transmitted by the second radio access node. A frequency with which the one or more metrics are measured varies as a function of one or more of: a difference between the values of the one or more metrics for signals transmitted by the first radio access node and the values of the one or more metrics for signals transmitted by the second radio access node; and a rate of change of the difference between the values of the one or more metrics for
(Continued)

signals transmitted by the first radio access node and the values of the one or more metrics for signals transmitted by the second radio access node.

20 Claims, 7 Drawing Sheets

(51) Int. Cl.
*H04W 24/10* (2009.01)
*H04W 48/18* (2009.01)

(58) Field of Classification Search
CPC ......... H04W 36/0069; H04W 36/0083; H04W 36/0085; H04W 36/0094; H04W 36/03; H04W 36/08; H04W 36/14; H04W 36/18; H04W 36/24; H04W 36/30; H04W 48/18; H04W 80/04
See application file for complete search history.

(56) References Cited

U.S. PATENT DOCUMENTS

| | | |
|---|---|---|
| 2011/0269449 A1 | 11/2011 | Kazmi et al. |
| 2012/0252368 A1 | 10/2012 | Edara |

OTHER PUBLICATIONS

Giordani et al, Multi-Connectivity in 5G mmWave Cellular Networks, arXiv, 7 pages, Apr. 2016.*
International Search Report and Written Opinion of the International Searching Authority, PCT/SE2017/050949, dated Dec. 11, 2017, 15 pages.

* cited by examiner

METHODS AND APPARATUS FOR MEASUREMENT AND MEASUREMENT REPORTING IN A WIRELESS NETWORK

CROSS REFERENCE TO RELATED APPLICATIONS

This application is a 35 U.S.C. § 371 national stage application of PCT International Application No. PCT/SE2017/050949 filed on Sep. 28, 2017, which in turn claims domestic priority to U.S. Provisional Patent Application No. 62/402,367, filed on Sep. 30, 2016, the disclosures and content of which are incorporated by reference herein in their entirety.

TECHNICAL FIELD

Examples of the present disclosure relate to methods and apparatus in a wireless network, and particularly relate to methods and apparatus for measurement reporting by a terminal device of a wireless network.

BACKGROUND

Efforts are on-going to standardize wireless communication technologies meeting the performance requirements for the fifth generation (5G), as established by the Next Generation Mobile Networks Alliance. 5G networks are expected to utilize spectrum at higher frequencies than existing wireless communication technologies. Channel variations can be both faster and more severe due to lower dispersion at high frequencies. Typically, handover (HO) measurements are averaged in time and relatively slow in order to avoid ping-pong effects. Doing frequent HO to and from the same cells in normal scenarios should be avoided since it will increase overhead, both in terms of random access resources and radio resource control (RRC) signalling and also increase the risk of HO failures. Hence, there are good reasons why conventional HO measurements are configured as they are, i.e. relatively slow. For example, in long term evolution (LTE), user equipments (UEs) are required to perform intra frequency handover measurements within 200 ms and inter frequency measurements within 480 ms when there is no discontinuous reception (DRX) applied. Even longer time periods are required to perform measurements when DRX is applied. These handover measurements (received signal received power, RSRP, or received signal received quality, RSRQ) are too slow to be able to react to sudden channel changes. Further, one of the 5G requirements states that there should be no user plane (UP) interruption, at least for some services. Thus, 5G networks should have an ultra-reliable connection and should aim for a zero-time UP interruption when a handover is performed.

One way to overcome this problem is to use multi-connectivity (MC) solutions such as LTE dual connectivity (DC), LTE carrier aggregation (CA), Co-ordinated multi point (CoMP) or multiple-input-multiple-output (MIMO) schemes and LTE-5G integration with a LTE-DC-like scheme.

"Full" MC solutions, i.e. using UP aggregation and control plane (CP) diversity, require dual TX/RX UEs which may be costly. Other MC solutions like "fast UP switch" probably only need single TX/RX UEs (i.e. no CP diversity) or single TX/dual RX. The LTE DC solution consists of a Master eNodeB (MeNB) and a secondary eNodeB (SeNB). It is the MeNB that initiates an addition of a SeNB node, based on UE measurements (of adjacent nodes).

In the Fast UP switch solution the UE is synchronized (and can listen) to more than one node at a time (as for the full MC solution). This means that it should be possible to do the UP switch without any user data interruption. The MeNB decides to which node the data packets shall be sent based on feedback or measurements from the two nodes. However, to do so efficiently, the MeNB must have accurate information also of the link/node that is currently not used. This means the Fast UP switch solution has a similar problem as the normal handover, namely that it needs fast UE measurements and reporting.

SUMMARY

One problem with today's mobility solution is that it may not react fast enough for the higher 5G requirements of ultra-reliable connections. As said above, the mobility measurements in LTE take at least 200 ms for intra frequency measurements and 480 ms for inter frequency measurements.

An additional problem is the additional time-to-trigger for reacting to the mobility measurements. FIG. 1 shows an example of this, in which the signal strength from a first, serving radio access node (NB1) varies rapidly, while the signal strength from a second radio access node (NB2) slowly increases. In one measurement period, the signal strength for NB1 drops from a value that is initially much higher than the signal strength for NB2, to a value that is much lower than the signal strength for NB2. As measurements are based on averages over the measurement period, the average value for NB1 over that measurement period is nonetheless higher than that for NB2. The average value for NB1 is not lower than that for NB2 until the end of the subsequent measurement period, by which time it is much lower. The measurement report is not sent to the serving radio access node until a time-to-trigger time window has expired, and thus the network may not learn of the changed signal strength for a significant period of time has elapsed. In extreme cases, this may lead to radio link failure.

In the case of a 5G network, using millimetre-wave frequencies (e.g. 28 GHz and above), the coverage may be rather patchy due to worse propagation conditions. For the UE to be able to switch to another node fast enough or even switch to a different radio access technology (RAT) on lower frequencies, the measurements need to be faster in some scenarios.

In principle, configuring higher measurement and reporting frequency would allow better possibilities to react to sudden changes in channel variations between multiple measured links. However, such a solution is not optimal since all measurements consume battery, while increased reporting increases control channel overhead and require additional random access channel (RACH) resources.

According to embodiments of the disclosure, there is provided a method in a terminal device of a wireless telecommunication network, the wireless telecommunication network further comprising first and second radio access nodes, the method comprising: repeatedly measuring one or more metrics for signals transmitted by the first radio access node and signals transmitted by the second radio access node; wherein a frequency with which the one or more metrics are measured varies as a function of a difference between the values of the one or more metrics for signals transmitted by the first radio access node and the values of the one or more metrics for signals transmitted by the second radio access node.

In a further aspect, there is provided a method in a terminal device of a wireless telecommunication network, the wireless telecommunication network further comprising first and second radio access nodes, the method comprising: periodically measuring one or more metrics for signals transmitted by the first radio access node and signals transmitted by the second radio access node; wherein a frequency with which the one or more metrics are measured varies in dependence on a rate of change of a difference between the values of the one or more metrics for signals transmitted by the first radio access node and the values of the one or more metrics for signals transmitted by the second radio access node.

In another aspect, there is provided a terminal device of a wireless telecommunication network, the wireless telecommunication network further comprising first and second radio access nodes, the terminal device being configured to: repeatedly measure one or more metrics for signals transmitted by the first radio access node and signals transmitted by the second radio access node; wherein a frequency with which the one or more metrics are measured varies as a function of a difference between the values of the one or more metrics for signals transmitted by the first radio access node and the values of the one or more metrics for signals transmitted by the second radio access node.

In a further aspect, there is provided a terminal device of a wireless telecommunication network, the wireless telecommunication network further comprising first and second radio access nodes, the terminal device comprising processor circuitry and a computer-readable medium containing instructions executable by the processor circuitry, whereby the terminal device is operative to: repeatedly measure one or more metrics for signals transmitted by the first radio access node and signals transmitted by the second radio access node; wherein a frequency with which the one or more metrics are measured varies as a function of a difference between the values of the one or more metrics for signals transmitted by the first radio access node and the values of the one or more metrics for signals transmitted by the second radio access node.

Another aspect provides a terminal device of a wireless telecommunication network, the wireless telecommunication network further comprising first and second radio access nodes, the terminal device comprising: a first module configured to repeatedly measure one or more metrics for signals transmitted by the first radio access node and signals transmitted by the second radio access node; wherein a frequency with which the one or more metrics are measured varies as a function of a difference between the values of the one or more metrics for signals transmitted by the first radio access node and the values of the one or more metrics for signals transmitted by the second radio access node.

A further aspect provides a terminal device for a wireless telecommunication network, the wireless telecommunication network further comprising first and second radio access nodes, the terminal device being configured to: periodically measure one or more metrics for signals transmitted by the first radio access node and signals transmitted by the second radio access node; wherein a frequency with which the one or more metrics are measured varies in dependence on a rate of change of a difference between the values of the one or more metrics for signals transmitted by the first radio access node and the values of the one or more metrics for signals transmitted by the second radio access node.

Another aspect of the disclosure provides a terminal device of a wireless telecommunication network, the wireless telecommunication network further comprising first and second radio access nodes, the terminal device comprising processor circuitry and a computer-readable medium containing instructions executable by the processor circuitry, whereby the terminal device is operative to: periodically measure one or more metrics for signals transmitted by the first radio access node and signals transmitted by the second radio access node; wherein a frequency with which the one or more metrics are measured varies in dependence on a rate of change of a difference between the values of the one or more metrics for signals transmitted by the first radio access node and the values of the one or more metrics for signals transmitted by the second radio access node.

In another aspect, the disclosure provides a terminal device of a wireless telecommunication network, the wireless telecommunication network further comprising first and second radio access nodes, the terminal device comprising: a first module configured to periodically measure one or more metrics for signals transmitted by the first radio access node and signals transmitted by the second radio access node;

wherein a frequency with which the one or more metrics are measured varies in dependence on a rate of change of a difference between the values of the one or more metrics for signals transmitted by the first radio access node and the values of the one or more metrics for signals transmitted by the second radio access node.

A further aspect provides a method in a node of a wireless telecommunication network, the method comprising: initiating transmission, to a terminal device of the wireless telecommunication network, of configuration information for use by the terminal device in determining a frequency with which to repeatedly measure one or more metrics for signals transmitted by a first radio access node and signals transmitted by a second radio access node; wherein the configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

A further aspect of the disclosure provides a node of a wireless telecommunication network, the node being configured to: initiate transmission, to a terminal device of the wireless telecommunication network, of configuration information for use by the terminal device in determining a frequency with which to repeatedly measure one or more metrics for signals transmitted by a first radio access node and signals transmitted by a second radio access node; wherein the configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Another aspect of the disclosure provides a node of a wireless telecommunication network, the node comprising processor circuitry and a computer-readable medium containing instructions executable by the processor circuitry, whereby the node is operative to: initiate transmission, to a terminal device of the wireless telecommunication network, of configuration information for use by the terminal device in determining a frequency with which to repeatedly measure one or more metrics for signals transmitted by a first radio access node and signals transmitted by a second radio access node; wherein the configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Another aspect of the disclosure provides a node of a wireless telecommunication network, comprising: a first module configured to initiate transmission, to a terminal device of the wireless telecommunication network, of configuration information for use by the terminal device in determining a frequency with which to repeatedly measure one or more metrics for signals transmitted by a first radio access node and signals transmitted by a second radio access node; wherein the configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

In a further aspect, there is provided a method in a terminal device of a wireless telecommunication network, the wireless telecommunication network further comprising first and second radio access nodes, the method comprising: measuring one or more metrics for signals transmitted by the first radio access node and signals transmitted by the second radio access node; and, upon expiry of a time-to-trigger (TTT) time window since the measuring step, transmitting a measurement report comprising measured values for the one or more metrics for signals transmitted by the first radio access node and signals transmitted by the second radio access node, wherein a length of the TTT time window varies as a function of a difference between the values of the one or more metrics for signals transmitted by the first radio access node and the values of the one or more metrics for signals transmitted by the second radio access node.

In another aspect, there is provided a method in a terminal device of a wireless telecommunication network, the wireless telecommunication network further comprising first and second radio access nodes, the method comprising: measuring one or more metrics for signals transmitted by the first radio access node and signals transmitted by the second radio access node; and, upon expiry of a time-to-trigger (TTT) time window since the measuring step, transmitting a measurement report comprising measured values for the one or more metrics for signals transmitted by the first radio access node and signals transmitted by the second radio access node, wherein a length of the TTT time window varies as a function of a rate of change of a difference between the values of the one or more metrics for signals transmitted by the first radio access node and the values of the one or more metrics for signals transmitted by the second radio access node.

In a further aspect, there is provided a terminal device operable in a wireless telecommunication network, the wireless telecommunication network further comprising first and second radio access nodes, the terminal device comprising processing circuitry and a machine-readable medium storing instructions which, when executed by the processing circuitry, cause the terminal device to: measure one or more metrics for signals transmitted by the first radio access node and signals transmitted by the second radio access node; and, upon expiry of a time-to-trigger (TTT) time window since the measuring step, transmit a measurement report comprising measured values for the one or more metrics for signals transmitted by the first radio access node and signals transmitted by the second radio access node, wherein a length of the TTT time window varies as a function of a difference between the values of the one or more metrics for signals transmitted by the first radio access node and the values of the one or more metrics for signals transmitted by the second radio access node.

In a further aspect, there is provided a terminal device operable in a wireless telecommunication network, the wireless telecommunication network further comprising first and second radio access nodes, the terminal device comprising processing circuitry and a machine-readable medium storing instructions which, when executed by the processing circuitry, cause the terminal device to: measure one or more metrics for signals transmitted by the first radio access node and signals transmitted by the second radio access node; and, upon expiry of a time-to-trigger (TTT) time window since the measuring step, transmit a measurement report comprising measured values for the one or more metrics for signals transmitted by the first radio access node and signals transmitted by the second radio access node, wherein a length of the TTT time window varies as a function of a rate of change of a difference between the values of the one or more metrics for signals transmitted by the first radio access node and the values of the one or more metrics for signals transmitted by the second radio access node.

It should be noted that, although the methods and apparatus set forth herein are described largely in the context of future networks that are configured to meet, or attempt to meet, the requirements set forth for 5G networks, the concepts disclosed herein are in no way limited to such networks or such radio-access technologies. Rather, the concepts disclosed herein may be beneficial in networks employing any radio-access technology, and are thus applicable to any wireless communication system.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
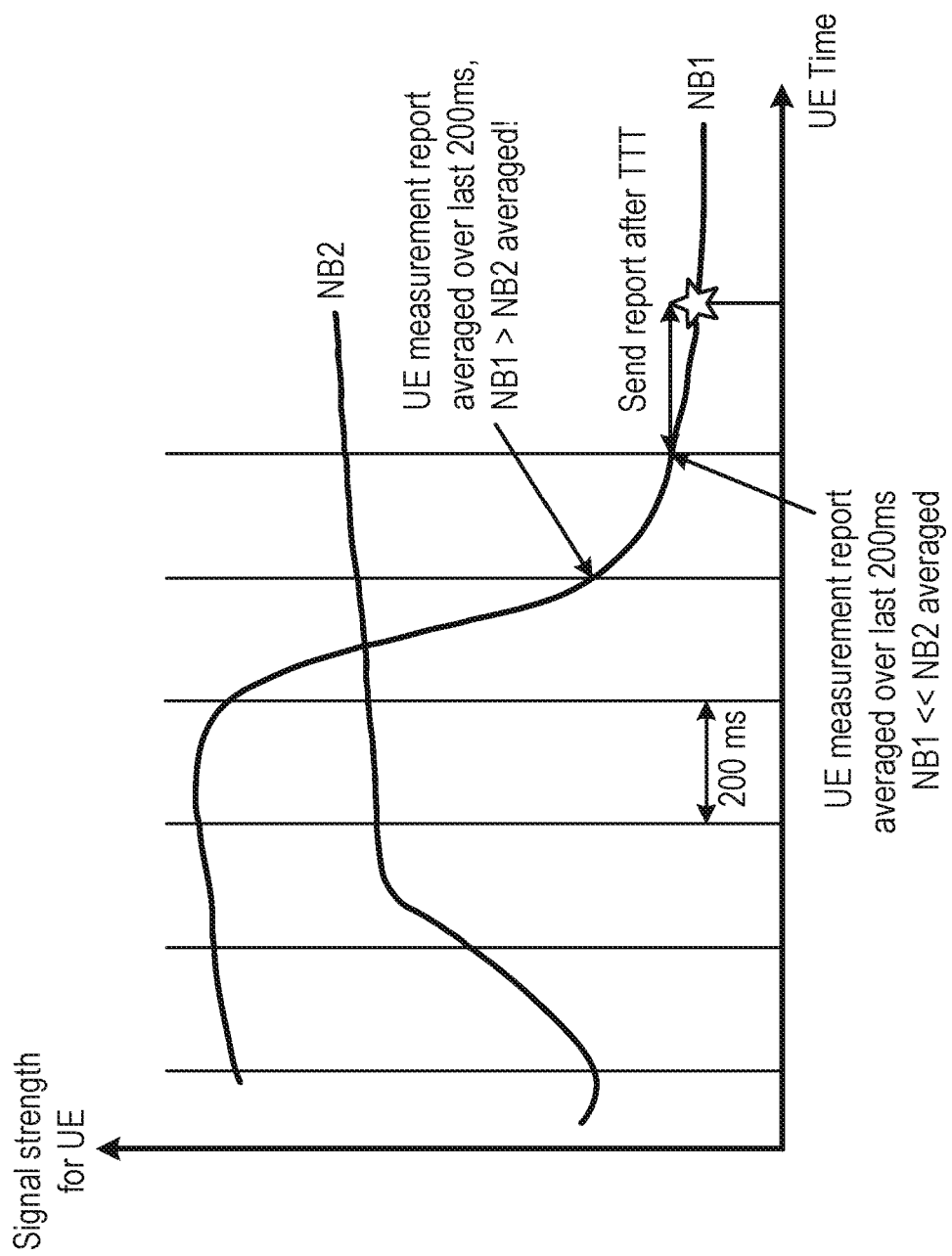
FIG. 1 is a graph illustrating the problem of rapidly changing signal strength.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Although the terms "wireless device" or "terminal device" may be used in the description, it is noted that these terms encompass other terms used to denote wireless devices, such as user equipment (UE). It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

It should be noted that use of the term "radio access node" as used herein can refer to a base station, such as a NodeB, eNodeB or Home eNodeB, a network node in the RAN responsible for resource management, such as a radio network controller (RNC), or, in some cases, a network node such as a mobility management entity (MME), a ProSe function (ProSe-F) node or a ProSe Application Server.

According to examples of the disclosure, the terminal device is configured with measurement and/or reporting intervals which vary as a function of the difference between the radio links to the multiple measured nodes. For example, the intervals may vary in such a way that when the links are very different the measurement and reporting is slower (i.e. at a lower frequency or with a longer measurement period) and when the links are closer in signal strength or quality, the measurements and/or reporting are intensified (i.e. at a higher frequency or with a shorter measurement period).

In further examples of the disclosure, the intervals may vary in dependence of the rate of change of the difference between the radio links to the multiple measured nodes. For example, the intervals may vary in such a way that when the difference is changing rapidly (i.e. the measured metric(s) for one radio access node is changing rapidly relative to the corresponding metric(s) for another radio access node) the measurement and reporting is faster (i.e. at a higher frequency or with a shorter measurement period) and when the difference is changing slowly or not at all, the measurements and/or reporting are slower (i.e. at a lower frequency or with a longer measurement period).

In one implementation, the terminal device may be configured with several sets of handover measurement settings. The choice/application of which setting depends on the difference of signal metrics between the neighbouring base stations/cells that provide the connections. Each set of settings may impact both layer 1 (L1) measurement frequencies and layer 3 (L3) measurement report frequencies.

Figure 2:
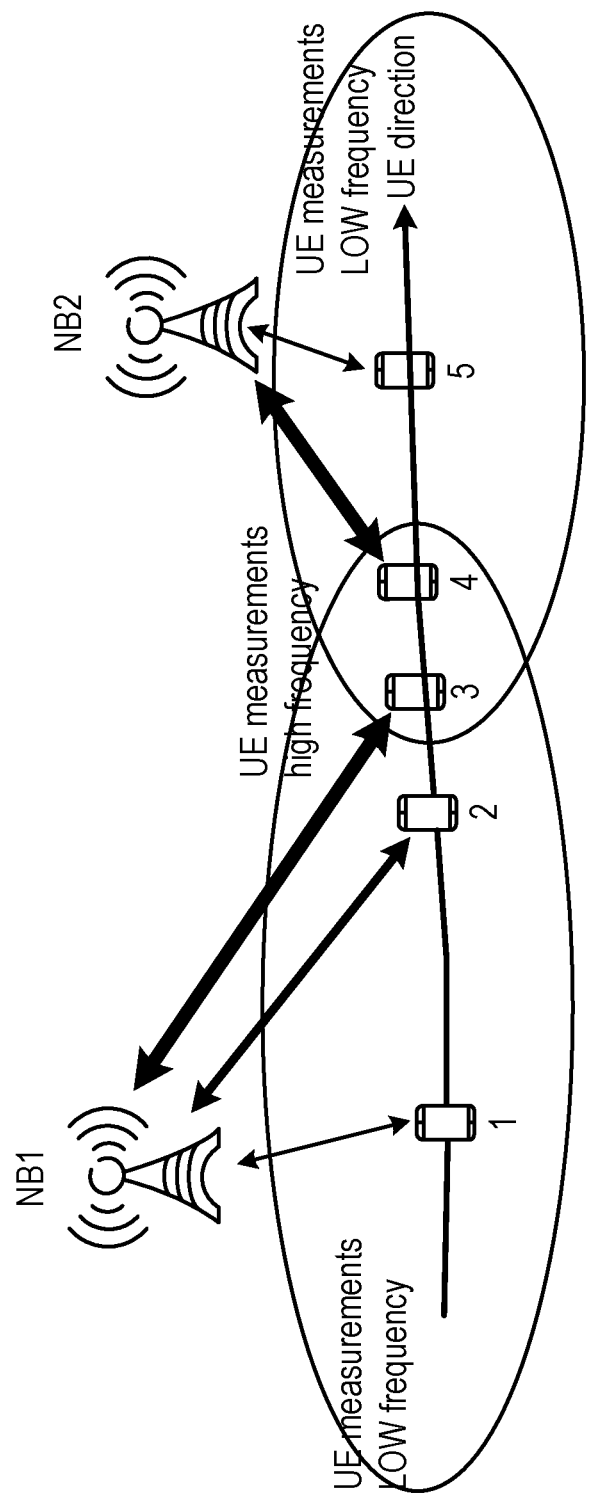
FIG. 2 is a schematic drawing of a wireless telecommunications network according to examples of the disclosure.

FIG. 2 shows an overview of a wireless network according to examples of the disclosure.

The network comprises a first radio access node NB1 and a second radio access node NB2. Each radio access node NB1 and NB2 provides radio coverage to a respective cell. In the illustrated example, the two cells overlap partially such that terminal devices in the overlapping part may be served by either the first radio access node NB1 or the second radio access node NB2; however, in other examples the cells may be non-overlapping, with terminal devices merely able to detect signals from both radio access nodes. It should be further noted that future networks may be configured differently than today's cellular networks, and may not utilize concepts such as cells. The present disclosure is not limited in this respect, and is applicable to any situation in which a terminal device can detect and measure signals from multiple radio access nodes at the same time.

Five terminal devices are illustrated in FIG. 2, given reference numerals 1, 2, 3, 4 and 5. Alternatively, the illustration may be thought of as showing the movement of a single terminal device from location 1 to location 5.

When the terminal device is at point 1), relatively close to NB1 and relatively far from NB2, the signal from NB1 will in general be much stronger than the signal from NB2 (if the latter is even detectable). The terminal device is also served by NB1. When at point 2), the terminal device is still relatively close to and served by NB1, but is now nearer the cell edge and closer to NB2 than at location 1). The signal from NB2 is now stronger. When the terminal device is at point 3), it is now at the cell edge and thus at a similar distance from both NB1 and NB2. Although still served by NB1, the difference in signal strength between the signals from NB1 and NB2 is now relatively small. When the terminal device is at point 4), the signal strength from NB2 is now higher than that from NB1, and the terminal device is now served by NB2. However, signals from NB1 can still be detected as the device is close to the cell edge. When the terminal device is at point 5), it is close to (and served by) NB2, and a long way from NB1. The signal from NB2 is therefore much stronger in general than the signal from NB1 (if the latter is even detectable).

According to examples of the disclosure, the frequency with which the terminal device measures signal metrics from NB1 and NB2, and/or transmits measurement reports comprising the measured values for those signal metrics, varies in dependence on the difference between the signal metrics.

For example, the terminal device at location 1) is likely to receive very strong signals from NB1, but no or very weak signals from NB2 (and similarly devices at location 5), vice versa). Accordingly, the difference between the signal metrics for NB1 and NB2 is likely to be very large. The terminal device at location 1) may therefore be configured to measure signal metrics for NB1 and NB2, and/or transmit measurement reports comprising the measured values for those signal metrics, at a relatively low frequency. The reason behind this is that the signal metrics are unlikely to change so rapidly that the large difference is overturned (e.g. such that handover from NB1 to NB2 is warranted) in a single measurement period. In this configuration, battery power in the terminal device can be conserved by the low measurement and/or reporting frequency.

The terminal device at location 2) may be configured to measure signal metrics for NB1 and NB2, and/or transmit measurement reports comprising the measured values for those signal metrics, at a relatively higher frequency than devices at location 1). For example, there is now a higher (albeit still low) chance that the signal metrics may change such that the difference between them is overturned in a single measurement period (e.g. and handover is warranted). Therefore the terminal device is configured to measure and/or report at a higher frequency.

The terminal device at location 3 (and similarly devices at location 4), vice versa) may be configured to measure signal metrics for NB1 and NB2, and/or transmit measurement reports comprising the measured values for those signal metrics, at a still higher frequency than devices at location 2). As the device is at the cell edge and there is only a small difference between the measured signal metrics for NB1 and NB2, there is now a high chance that the signal metrics may change such that the difference between them is overturned in a single measurement period (e.g. and handover is warranted). Therefore the terminal device is configured to measure and/or report at a high frequency. Due to the frequent measurement reports, any handover events are triggered in time and the terminal device can make a successful handover to NB2.

Figure 3:
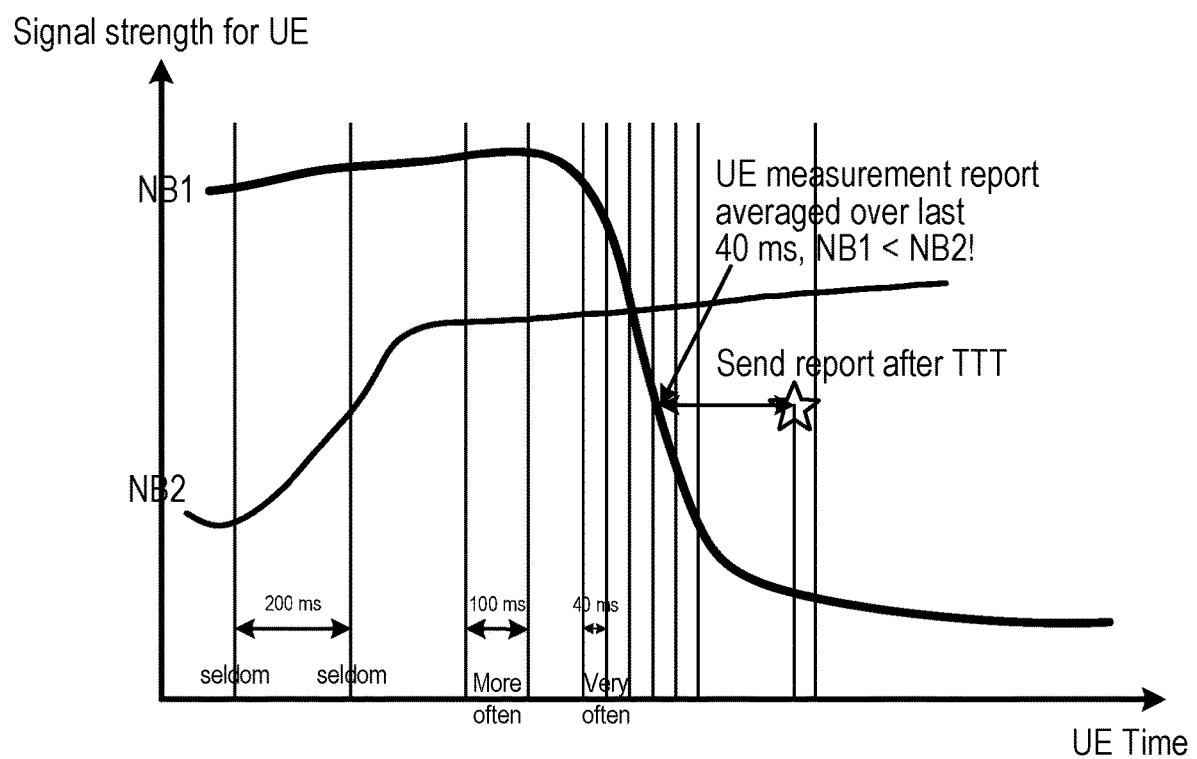
FIG. 3 is a graph showing measurement and measurement reporting according to examples of the disclosure.

FIG. 3 is a graph showing measurement and measurement reporting in a terminal device according to examples of the disclosure. The terminal device repeatedly measures signal strength from two radio access nodes NB1 and NB2 over a period of time. The graph shows the instantaneous variation of signal strength for signals from NB1 and NB2, as well as the measurement periods (shown as vertical lines) in the terminal device.

Initially, the signal strength from NB1 is significantly higher than that from NB2. In accordance with examples of the disclosure, as the difference between the two signal metrics is relatively large, the measurement frequency is relatively low. In the illustration, the terminal device is configured to measure and/or report the signal strengths of each signal every 200 ms. The terminal device may be configured to achieve this by detecting the signal strengths over a measurement period (e.g. lasting 200 ms) and determining the average value of the signal strength (or other signal metric) during that measurement period.

After two measurement periods at the low frequency (i.e. long measurement period), the signal strength of NB2 increases while the signal strength of NB1 stays approximately the same. The difference between the two signals is therefore reduced, and the frequency with which the terminal device is configured to measure the signal metrics is increased (e.g. the measurement period is reduced, in the illustrated example, to 100 ms).

After two measurement periods at this intermediate frequency (i.e. intermediate measurement period), the signal strength of NB1 begins to drop rapidly, while the signal strength of NB2 remains substantially constant (in fact increasing slightly). The difference between the two measured metrics is thus reduced further and the frequency with which the terminal device is configured to measure the signal metrics is increased further (e.g. the measurement period is reduced, in the illustrated example, to 40 ms).

As the measurement period is so short, the terminal device is able to determine in a short period of time when the signal strength for NB1 falls below that of NB2 (or some other performance criterion is met). After a time-to-trigger (TTT) time window has elapsed, the terminal device transmits a measurement report to the network (e.g. to its serving radio access node NB1), comprising the measured values of the signal metrics.

The network may act on the measurement report, for example, by initiating a handover process between NB1 and NB2. Compared to conventional methods (e.g. as shown in FIG. 1), the measurement report can be sent much earlier.

Thus the terminal device is configured to measure signal metrics from radio access nodes at a frequency (or, correspondingly, over a measurement period) that varies as a function of the difference between the measured values. In one implementation, the terminal device may be configured with a plurality of values (e.g. for the measurement period or the measurement frequency) for different values, or ranges of values, for the difference between the measured signal metrics. A simple example, for the measurement period, is shown in Table 1.

TABLE 1

Measurement period table

| Quality delta (serving-adjacent) | Measurement period |
|---|---|
| 30, to 20 dB | 400 ms |
| 20 to 10 dB | 200 ms |
| 10 to 6 | 100 ms |
| <6 dB | 40 ms |

In further examples of the disclosure, the frequency with which the terminal device is configured to measure the signal metrics varies as a function of the rate of change of the difference between the measured values for those signal metrics. Thus, in these examples, the terminal device is configured to measure the derivative of the difference between measured values for the signal metrics for multiple radio access nodes. In one implementation, this is achieved by storing past measured values for the signal metrics (e.g. in a local memory) and determining the rate of change by assuming a constant rate of change from one value to the next, or by mapping a line of best fit between the multiple stored values.

For example, the frequency with which the one or more metrics are measured may vary such that the frequency is relatively low when the rate of change of the difference is relatively low (i.e. the situation is relatively static), and the frequency is relatively high when the rate of change of the difference is relatively high (i.e. one signal is changing rapidly with respect to the other). In the latter case it may be appropriate for the terminal device, even if the signal difference is relatively high, to measure and/or report measurements rapidly.

The variation of measurement and/or reporting frequency may be implemented in the terminal device with coefficients that are applied to the predetermined measurement frequency or measurement period to give a new measurement frequency or measurement period. For example, the terminal device may have access to a table comprising values for the rate of change of the difference, or ranges of values for the rate of change of the difference, and corresponding coefficients to be applied to the predetermined measurement frequency or measurement period. The predetermined measurement frequency or measurement period may be those as discussed above (i.e. ones that vary with the difference between the measured signal metrics) or conventional fixed measurement frequencies and periods (i.e. as in LTE).

In further examples of the disclosure, the time-to-trigger (TTT) time window may itself vary in dependence on the difference between values for measured signal metrics for the multiple radio access nodes (and/or with the rate of change of that difference). Note that the TTT time window may vary independently of the measurement frequency and/or measurement reporting frequency. So, in some examples of the disclosure, the TTT time window varies but the measurement frequency and/or measurement reporting frequency do not; in other examples, the measurement frequency and/or measurement reporting frequency vary but the TTT time window does not; and in other examples both the measurement frequency and/or measurement reporting frequency and the TTT time window vary.

For example, the TTT time window may be configured to vary such that it is relatively long when the difference between the measured signal metrics is large (and/or the rate of change of that difference is low), and such that it is relatively short when the difference between the measured signal metrics is relatively small (and/or the rate of change of that difference is high).

Figure 4:
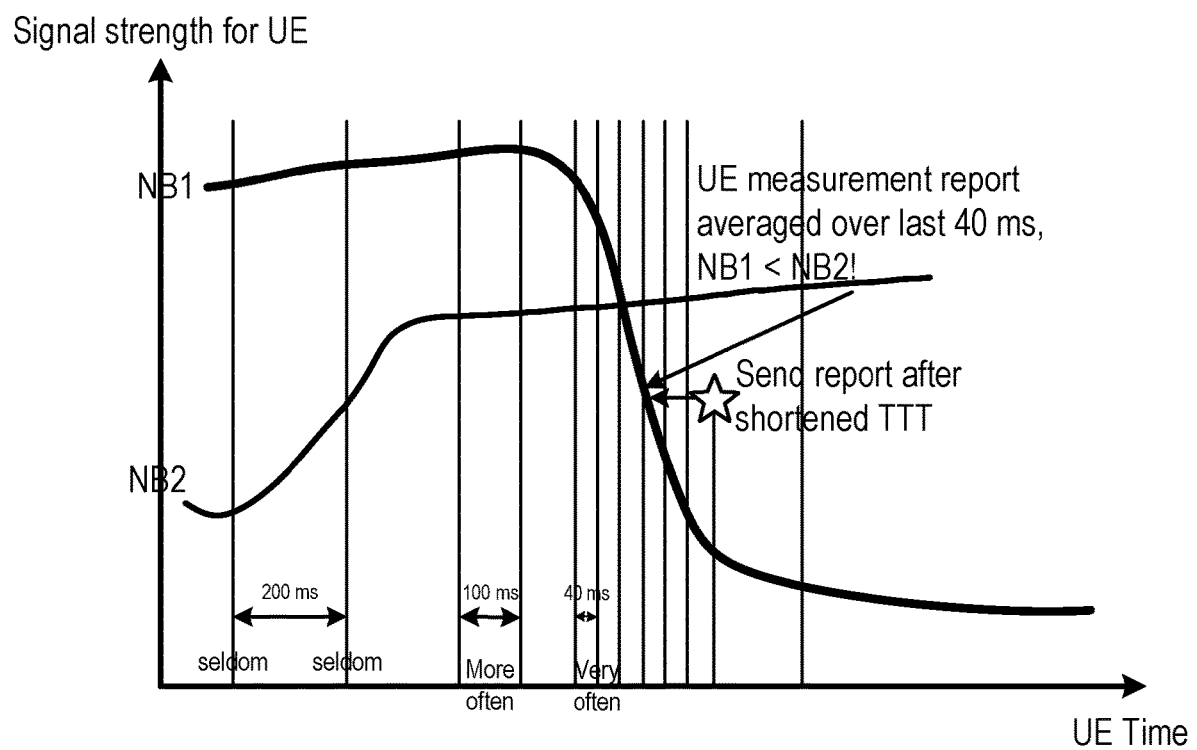
FIG. 4 is a graph showing measurement and measurement reporting according to further examples of the disclosure.

FIG. 4 is a graph showing measurement and measurement reporting according to further examples of the disclosure. The graph is substantially similar to that shown in FIG. 3; however, in this example the TTT time window value varies with the difference between the measured signal metrics from NB1 and NB2. Thus, shortly after the signal strength for NB1 falls below that of NB2 (when the measurement period is relatively short), the terminal device is configured to transmit a measurement report to its serving radio access node (i.e. NB1) after a TTT time window that is itself relatively short. The measurement report can thus be sent at a time that is even earlier than that shown in FIG. 3.

Note that the terminal device may be configured to transmit a measurement report for every measurement (i.e. periodically), or in an event-driven way (e.g. when the measured signal metrics meet some reporting criterion, such as the serving signal strength falling below the signal strength of another radio access node).

In one implementation, the terminal device may be configured with a plurality of values for the TTT time window for different values, or ranges of values, for the difference between the measured signal metrics. A simple example is shown in Table 2.

In yet another embodiment the TTT is also adjusted, see Table 2.

TABLE 2

Measurement period table

| Quality delta (serving-adjacent) | Measurement period | TTT |
|---|---|---|
| 30, to 20 dB | 400 ms | 480 ms |
| 20 to 10 dB | 200 ms | 240 ms |
| 10 to 6 | 100 ms | 120 ms |
| <6 dB | 40 ms | 60 ms |

Figure 5:
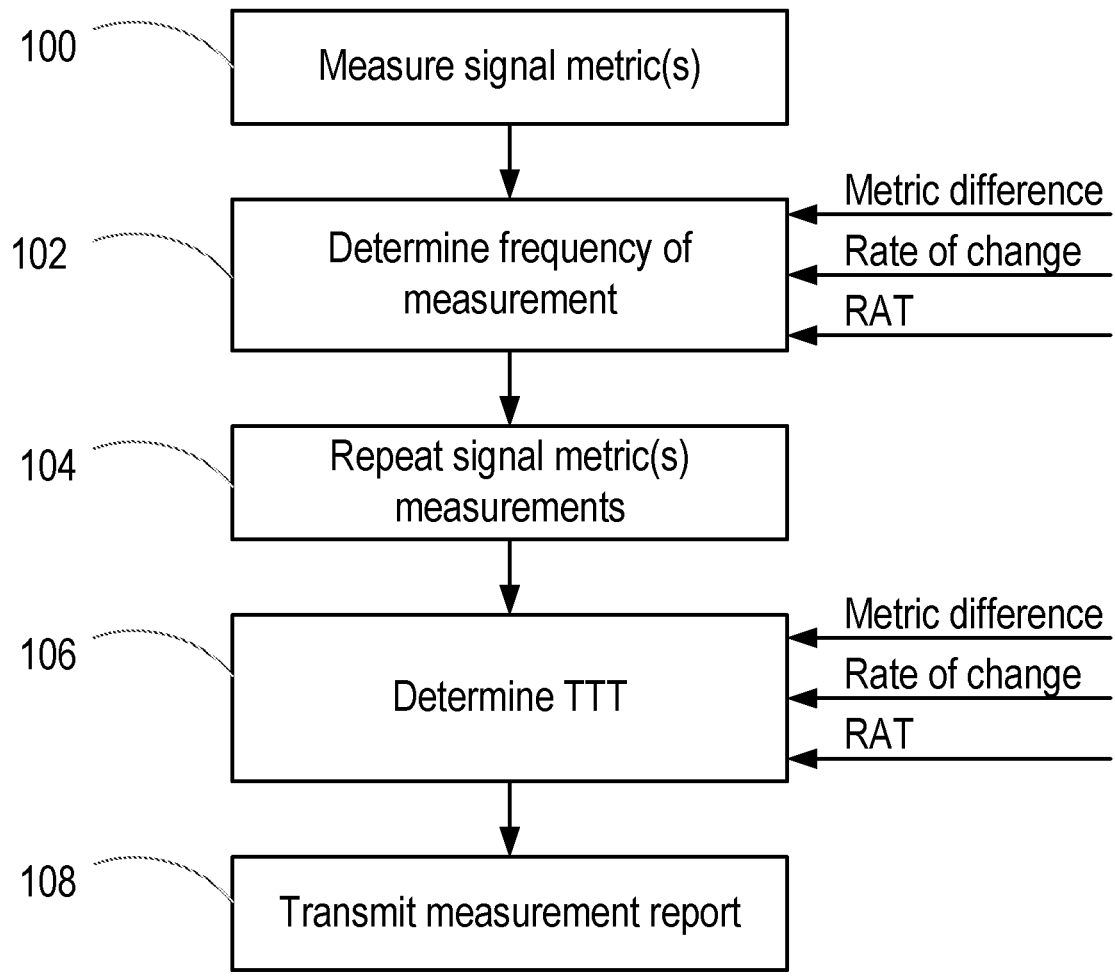
FIG. 5 is a flowchart of a method in a terminal device according to examples of the disclosure.

FIG. 5 is a flowchart of a method in a terminal device according to examples of the disclosure.

In step 100, the terminal device measures one or metrics for signals received from multiple radio access nodes (i.e. the serving radio access node and one or more other radio access nodes). The metrics may be one or more of: signal strength, received signal received power (RSRP), and received signal received quality (RSRQ). The measurement may comprise, for example, determining average values (e.g. mean values) for the signal metrics over a measurement period.

In step 102, the terminal device determines the frequency or, equivalently, the measurement period with which it should measure those signal metrics. The frequency may vary as a function of one or more of: the difference between the values of the signal metrics measured in step 100; a rate of change of the difference between those values; and a radio access technology utilized to measure the signal metrics. The difference between the measured values may affect the measurement frequency such that a relatively large difference leads to a relatively low frequency, while a relatively small difference leads to a relatively high frequency. The rate of change in the difference may affect the measurement frequency such that a relatively low rate of change leads to a relatively low measurement frequency, while a relatively high rate of change leads to a relatively high measurement frequency. Different values (or sets of values) may be specified for different radio access technologies. For example, certain radio access technologies (e.g. those using higher transmission frequencies) may be more susceptible to rapidly varying radio link conditions than others (e.g. those using lower transmission frequencies). The former RATs may therefore benefit from shorter measurement periods than the latter RATs. The different effects of these parameters may be combined, as explained above.

Step 102 may comprise the terminal device accessing a look-up table or other mechanism in order to determine the appropriate frequency for the measured parameters. For example, the terminal device may be configured with such information by signalling from a radio access node (such as RRC signalling), or hard-coded with such information upon manufacture.

In step 104, the terminal device repeats the measurement of the signal metrics, according to the frequency or measurement period determined in step 102. Thus, such a measurement may comprise determining the average of the signal metrics over the determined measurement period.

In step 106, the terminal device determines an appropriate time-to-trigger (TTT) time window value. The TTT time window value may vary as a function of one or more of: the difference between the values of the signal metrics measured in step 100; a rate of change of the difference between those values; and a radio access technology utilized to measure the signal metrics. The difference between the measured values may affect the measurement frequency such that a relatively large difference leads to a relatively high TTT time window value, while a relatively small difference leads to a relatively small TTT time window value. The rate of change in the difference may affect the measurement frequency such that a relatively low rate of change leads to a relatively high TTT time window value, while a relatively high rate of change leads to a relatively small TTT time window value. Different values (or sets of values) may be specified for different radio access technologies. The different effects of these parameters may be combined, as explained above. Again, the value of the TTT time window value may be determined by accessing a look-up table or other mechanism stored on the terminal device.

In step 108, upon expiry of the TTT timer started after measurement of the signal metrics in step 104, the terminal device transmits a measurement report comprising the measured signal metric values to its serving radio access node. Note that the transmission of a measurement report may take place after every measurement (i.e. upon expiry of the TTT timer after every measurement), or upon the measurement meeting some criterion (e.g. upon the measured metrics for the serving node falling below those for another node, or falling below some threshold, etc).

Figure 6:
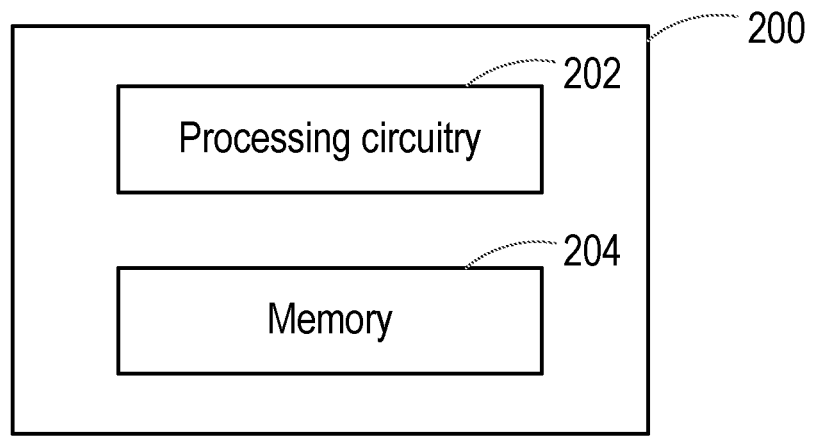
FIG. 6 is a schematic diagram of a terminal device according to examples of the disclosure.

FIG. 6 is a schematic diagram of a terminal device 200 according to examples of the disclosure, for use in a wireless telecommunications network. The terminal device 200 may be configured to carry out the method shown in FIG. 5, for example.

The terminal device 200 comprises processing circuitry 202 and a computer-readable medium 204 coupled to the processing circuitry. The computer-readable medium 204 stores code which, when executed by the processing circuitry 202, causes terminal device 200 to: repeatedly measure one or more metrics for signals transmitted by the first radio access node and signals transmitted by the second radio access node; wherein a frequency with which the one or more metrics are measured varies as a function of one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Figure 7:
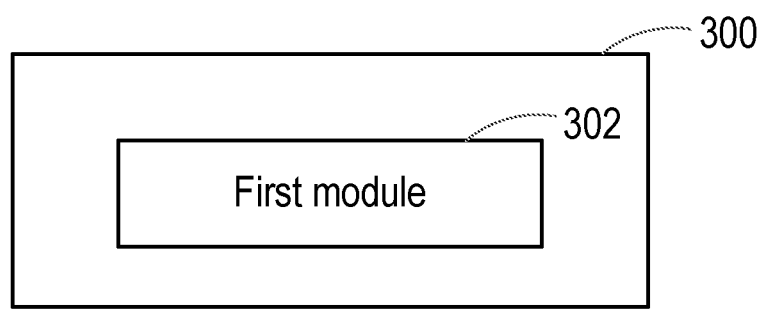
FIG. 7 is a schematic diagram of a terminal device according to further examples of the disclosure.

FIG. 7 is a schematic diagram of a terminal device 300 according to further examples of the disclosure, for use in a wireless telecommunications network. The terminal device 300 may be configured to carry out the method shown in FIG. 5, for example.

The terminal device 300 comprises a first module 302 configured to repeatedly measure one or more metrics for signals transmitted by the first radio access node and signals transmitted by the second radio access node; wherein a frequency with which the one or more metrics are measured varies as a function of one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Figure 8:
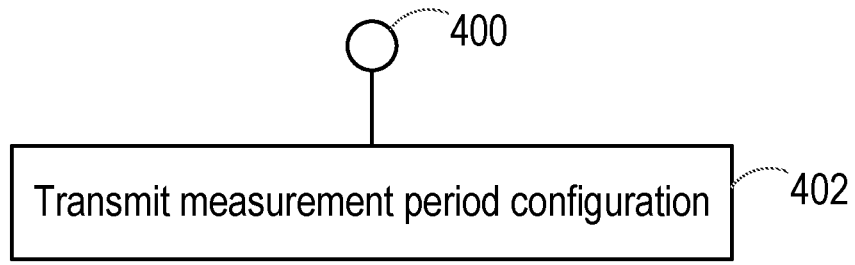
FIG. 8 is a flowchart of a method in a node according to examples of the disclosure.

FIG. 8 is a flowchart of a method in a network node according to examples of the disclosure. In one example, the network node is a radio access node serving a particular terminal device; in another example, the network node is a core network node (or a node coupled to the core network) in communication with the radio access node serving the terminal device. The method begins in step 400.

In step 402, the network node initiates transmission of measurement configuration information to the terminal device. For example, when the network node is the radio access node serving the terminal device, step 402 comprises transmitting the measurement configuration information to the terminal device. When the network node is not the radio access node, step 402 may comprise transmitting control signals to the radio access node serving the terminal device, with instructions for the radio access node to transmit the measurement configuration information to the terminal device.

The measurement configuration information may be transmitted using radio resource control (RRC) signalling, for example.

The measurement configuration information may be usable by the terminal device to determine a frequency with which the terminal device should measure one or more metrics for signals received from multiple radio access nodes in its surroundings. The measurement configuration information may be such that the terminal device is configured to measure the signal metrics at a frequency (or, equivalently, over a measurement period) that varies as a function of at least one or more of: a difference between the values of the one or more metrics for signals transmitted by the radio access nodes; and a rate of change of the difference between the values of the one or more metrics for signals transmitted by the radio access nodes.

For example, the measurement configuration information may comprise a plurality of values, or ranges of values, for the difference between the values of the one or more metrics for signals (e.g. expressed in dBs), and corresponding frequencies with which the one or more metrics are measured.

For example, the measurement configuration information may comprise a plurality of values, or ranges of values, for the rate of change of the difference between the values of the one or more metrics, and corresponding coefficients to be applied to the frequency with which the one or more metrics are measured.

Figure 9:
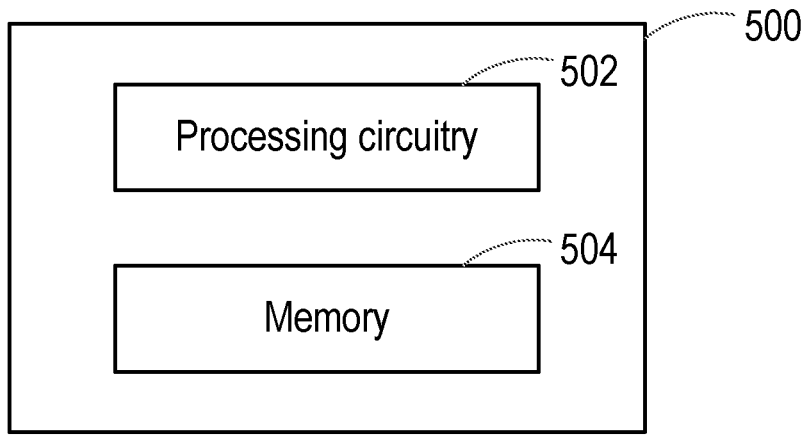
FIG. 9 is a schematic diagram of a node according to examples of the disclosure.

FIG. 9 is a schematic diagram of a network node 500 according to examples of the disclosure, for use in a wireless telecommunications network. The node may be configured to carry out the method shown in FIG. 8, for example. The network node may be a radio access node, for example, or a node in the core network of the wireless telecommunications network.

The network node 500 comprises processing circuitry 502 and a computer-readable medium 504 coupled to the processing circuitry. The computer-readable medium 504 stores code which, when executed by the processing circuitry 502, causes the network node to: initiate transmission, to a terminal device of the wireless telecommunication network, of configuration information for use by the terminal device in determining a frequency with which to repeatedly measure one or more metrics for signals transmitted by a first radio access node and signals transmitted by a second radio access node. The configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Figure 10:
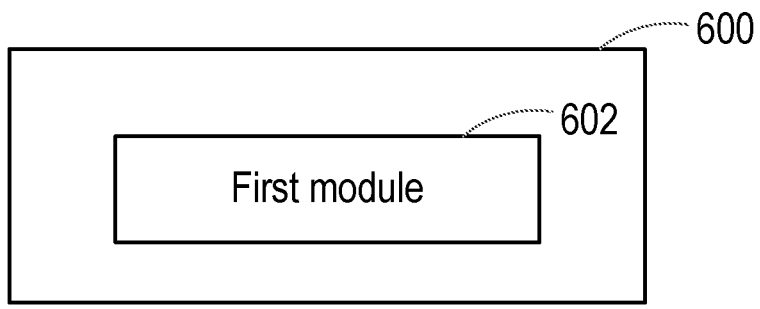
FIG. 10 is a schematic diagram of a node according to further examples of the disclosure.

FIG. 10 is a schematic diagram of a node 600 according to further examples of the disclosure, for use in a wireless telecommunications network. The node may be configured to carry out the method shown in FIG. 8, for example. The network node may be a radio access node, for example, or a node in the core network of the wireless telecommunications network.

The network node 600 comprises a first module 602 configured to initiate transmission, to a terminal device of the wireless telecommunication network, of configuration information for use by the terminal device in determining a frequency with which to repeatedly measure one or more metrics for signals transmitted by a first radio access node and signals transmitted by a second radio access node. The configuration information is such that the frequency with which the one or more metrics are measured varies as a function of at least one or more of: a difference between the values of the one or more metrics for signals transmitted by the first radio access node and the values of the one or more metrics for signals transmitted by the second radio access node; and a rate of change of the difference between the values of the one or more metrics for signals transmitted by the first radio access node and the values of the one or more metrics for signals transmitted by the second radio access node.

Although the description above has focussed on simplified scenarios in which signals from only two radio access nodes are detectable, it will be apparent to those skilled in the art that the network will in general comprise more than two radio access nodes and signals may be detected from those nodes. If the terminal device is able to detect and measure signals from multiple radio access nodes, the principles disclosed herein may take this into account by varying the frequency with which signal metrics are measured and/or reporting in dependence on the difference between the serving radio access node and one or more of the other detectable radio access nodes. For example, signals from the serving radio access node and the next strongest signal may be utilized to determine the difference, the rate of change of the difference, etc.

The present disclosure thus provides apparatus and methods for measuring and reporting measurements in a terminal device of a wireless communications network. Corresponding methods and apparatus are provided in a network node of the wireless communications network. By increasing the frequency with which measurements are taken by terminal devices and/or reported to the network when the difference between the measurements is small, radio link failure caused by sudden signal strength drop can be avoided. Conversely, by decreasing the frequency with which measurements are taken by terminal devices and/or reported to the network when the difference between the measurements is large, battery time in the terminal device is increased and overhead signalling reduced in the network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a terminal device of a wireless telecommunication network, the wireless telecommunication network further comprising a first radio access node and a second radio access node, the method comprising:
   receiving first signals transmitted by the first radio access node;
   measuring first metrics associated with the first signals;
   receiving second signals transmitted by the second radio access node;
   measuring second metrics associated with the second signals;
   determining a frequency at which to measure one or more metrics for subsequent first signals transmitted by the first radio access node and subsequent second signals transmitted by the second radio access node based on the first metrics and the second metrics;
   measuring, at the frequency, the one or more metrics for the subsequent first signals transmitted by the first radio access node and subsequent second signals transmitted by the second radio access node; and
   transmitting, to a serving radio access node, a measurement report including measured values for the one or more metrics,
   wherein determining the frequency comprises:
      determining a difference between the values of the first metrics and the values of the second metrics; and
      determining a rate of change of the difference between the values of the first metrics and the values of the second metrics.

2. The method opf claim 1, wherein determining the frequency further comprises determining the frequency based on the difference between the values of the first metrics and the values of the second metrics, with the frequency being inversely related to the difference such that the frequency is lower in response to a first difference between the values of the first metrics and the value of the second metrics than in response to a second difference between the values of the first metric and the second metrics in which the first difference is greater than the second difference.

3. The method of claim 1, wherein determining the frequency further comprises determining the frequency based on the rate of change of the difference between the values of the of the first metrics and the values of the second metrics, the frequency being correlated to the rate of change of the difference such that the frequency is lower in response to a first rate of change of the difference between the values of the first metrics and the value of the second metrics than in response to a second rate of change of the difference between the values of the first metric and the second metrics in which the first rate of change of the difference is lower than the second rate of change of the difference.

4. The method of claim 1,
wherein measuring the first metrics comprises determining average values associated with a feature of the first signals over a measurement period,
wherein measuring the second metrics comprises determining average values associated with the feature of the second signals over the measurement period, and
wherein measuring the one or more metrics comprises determining average values associated with the feature of the subsequent first signals and average values associated with the feature of the subsequent second signals over a subsequent measurement period.

5. The method of claim 4, further comprising:
determining a length of the subsequent measurement period based on at least one of:
the difference between the values of the first metrics and the values of the second metrics; and
the rate of change of the difference between the values of the first metrics and the values of the second metrics.

6. The method of claim 1, further comprising:
determining that at a time-to-trigger, TTT, time window has expired since measurement of the one or more metrics,
wherein transmitting the measurement report comprises transmitting, the measurement report responsive to determining that the TTT time window has expired.

7. The method of claim 6, further comprising:
determining a length of the TTT time window based on one or more of:
the difference between the values of the first metrics and the values of the second metrics; and
the rate of change of the difference between the values of the first metrics and the values of the second metrics.

8. The method of claim 1, wherein the first metrics, the second metrics, and the one or more metrics comprise one or more of: a received signal received power, RSRP; a received signal received quality, RSRQ; and a signal strength.

9. The method of claim 1, wherein determining the frequency further comprises determining the frequency based on a radio access technology employed to receive the first signals, the second signals, the subsequent first signals, and the second subsequent signals.

10. A terminal device of a wireless telecommunication network, the wireless telecommunication network further comprising a first radio access node and a second radio access node, the terminal device comprising:
processing circuitry; and
memory coupled to the processing circuitry having instructions stored therein that are executable by the processing circuitry to cause the terminal device to perform operations, the operations comprising:
receiving first signals transmitted by the first radio access node;
measuring first metrics associated with the first signals;
receiving second signals transmitted by the second radio access node;
measuring second metrics associated with the second signals;
determining a frequency at which to measure one or more metrics for subsequent first signals transmitted by the first radio access node and subsequent second signals transmitted by the second radio access node based on the first metrics and the second metrics, the first metrics, the second metrics, and the one or more metrics comprise one or more of: a received signal received power, RSRP; a received signal received quality, RSRQ; and a signal strength; and
measuring, at the frequency, the one or more metrics for the subsequent first signals transmitted by the first radio access node and subsequent second signals transmitted by the second radio access node; and
transmitting, to a serving radio access node, a measurement report including measured values for the one or more metrics,
wherein determining the frequency comprises at least one of:
determining a difference between the values of the first metrics and the values of the second metrics; and
determining a rate of change of the difference between the values of the first metrics and the values of the second metrics.

11. The terminal device of claim 10, wherein determining the frequency further comprises determining the frequency based on the difference between the values of the first metrics and the values of the second metrics, the frequency being inversely related to the difference such that the frequency is lower in response to a first difference between the values of the first metrics and the value of the second metrics than in response to a second difference between the values of the first metric and the second metrics in which the first difference is greater than the second difference.

12. The terminal device of claim 10, wherein determining the frequency further comprises determining the frequency based on the rate of change of the difference between the values of the of the first metrics and the values of the second metrics, the frequency being correlated to the rate of change of the difference such that the frequency is lower in response to a first rate of change of the difference between the values of the first metrics and the value of the second metrics than in response to a second rate of change of the difference between the values of the first metric and the second metrics in which the first rate of change of the difference is lower than the second rate of change of the difference.

13. The terminal device of claim 10,
wherein measuring the first metrics comprises determining average values associated with a feature of the first signals over a measurement period,
wherein measuring the second metrics comprises determining average values associated with the feature of the second signals over the measurement period, and
wherein measuring the one or more metrics comprises determining average associated with the feature of the subsequent first signals and average values associated with the feature of the subsequent second signals over a subsequent measurement period.

14. The terminal device of claim 13, the operations further comprising:
determining a length of the subsequent measurement period based on at least one of:
the difference between the values of the first metrics and the values of the second metrics; and
the rate of change of the difference between the values of the first metrics and the values of the second metrics.

15. A method in a node of a wireless telecommunication network, the method comprising:
- transmitting, to a terminal device of the wireless telecommunication network, of configuration information for use by the terminal device in determining a frequency at which to measure one or more metrics for signals transmitted by a first radio access node and signals transmitted by a second radio access node; and
- receiving, from the terminal device, a measurement report including measured values for the one or more metrics,
- wherein the configuration information is such that the frequency with which to measure the one or more metrics varies as a function of:
  - a difference between the values of the one or more metrics for signals transmitted by the first radio access node and the values of the one or more metrics for signals transmitted by the second radio access node; and
  - a rate of change of the difference between the values of the one or more metrics for signals transmitted by the first radio access node and the values of the one or more metrics for signals transmitted by the second radio access node.

16. The method of claim 15, wherein the configuration information comprises a plurality of values, or ranges of values, for the difference between the values of the one or more metrics for signals transmitted by the first radio access node and the values of the one or more metrics for signals transmitted by the second radio access node, and corresponding frequencies with which the one or more metrics are measured.

17. The method of claim 15, wherein the configuration information comprises a plurality of values, or ranges of values, for the rate of change of the difference between the values of the one or more metrics for signals transmitted by the first radio access node and the values of the one or more metrics for signals transmitted by the second radio access node, and corresponding coefficients to be applied to the frequency with which the one or more metrics are measured.

18. A node of a wireless telecommunication network, the node comprising:
- processing circuitry; and
- memory coupled to the processing circuitry having instructions stored therein that are executable by the processing circuitry to cause the terminal device to perform operations, the operations comprising:
  - transmitting, to a terminal device of the wireless telecommunication network, configuration information for use by the terminal device in determining a frequency at which to measure one or more metrics for signals transmitted by a first radio access node and signals transmitted by a second radio access node, the one or more metrics comprise one or more of: a received signal received power, RSRP; a received signal received quality, RSRQ; and a signal strength; and
  - receiving, from the terminal device, a measurement report including measured values for the one or more metrics,
  - wherein the configuration information is such that the frequency with which to measure the one or more metrics varies as a function of at least one or more of:
    - a difference between the values of the one or more metrics for signals transmitted by the first radio access node and the values of the one or more metrics for signals transmitted by the second radio access node; and
    - a rate of change of the difference between the values of the one or more metrics for signals transmitted by the first radio access node and the values of the one or more metrics for signals transmitted by the second radio access node.

19. The node of claim 18, wherein the configuration information comprises a plurality of values, or ranges of values, for the difference between the values of the one or more metrics for signals transmitted by the first radio access node and the values of the one or more metrics for signals transmitted by the second radio access node, and corresponding frequencies with which the one or more metrics are measured.

20. The node of claim 18, wherein the configuration information comprises a plurality of values, or ranges of values, for the rate of change of the difference between the values of the one or more metrics for signals transmitted by the first radio access node and the values of the one or more metrics for signals transmitted by the second radio access node, and corresponding coefficients to be applied to the frequency with which the one or more metrics are measured.

* * * * *